United States Patent
Chen et al.

(10) Patent No.: US 9,215,113 B1
(45) Date of Patent: Dec. 15, 2015

(54) LINK TRAINING IN A COMMUNICATION PORT

(71) Applicant: INTEL CORPORATION, Santa Clara, CA (US)

(72) Inventors: Huimin Chen, Portland, OR (US); Howard Heck, Hillsboro, OR (US); Hsiao-Ping J. Tsai, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/491,484

(22) Filed: Sep. 19, 2014

(51) Int. Cl.
*H03H 7/30* (2006.01)
*H03H 7/40* (2006.01)
*H03K 5/159* (2006.01)
*H04L 25/03* (2006.01)

(52) U.S. Cl.
CPC ............................. *H04L 25/03885* (2013.01)

(58) Field of Classification Search
CPC .................. H04L 25/03885; H04L 15/03878; H04L 25/03038; H04L 25/03057
USPC .......... 375/232, 285, 308, 231, 229, 233, 350
See application file for complete search history.

(56) References Cited

U.S. PATENT DOCUMENTS

| 6,314,135 | B1* | 11/2001 | Schneider et al. ............ 375/232 |
| 6,792,049 | B1* | 9/2004 | Bao et al. ...................... 375/285 |
| 2010/0202565 | A1* | 8/2010 | Abbasfar ....................... 375/308 |
| 2011/0317751 | A1* | 12/2011 | Roethig et al. ................ 375/232 |

OTHER PUBLICATIONS

Universal Serial Bus 3.1 Specification, Revision 1, Jul. 26, 2013, 631 pages.
Inter-Chip Supplement to the USB Revision 3.0 Specification, Revision 1.01, Feb. 11, 2013, 67 pages.
On-the-Go and Embedded Host Supplement to the USB Revision 3.0 Specification, Revision 1.1, May 10, 2012, 74 pages.

* cited by examiner

*Primary Examiner* — Phuong Phu
(74) *Attorney, Agent, or Firm* — International IP Law Group, PLLC

(57) ABSTRACT

Techniques for training a link are described herein. An example electronic device includes a port coupled to a link partner. The port and the link partner use closed-loop equalizer training to obtain receiver equalization coefficients for the receiver of the port and obtain transmitter equalization coefficients for the transmitter of the link partner.

16 Claims, 5 Drawing Sheets

LINK TRAINING IN A COMMUNICATION PORT

BACKGROUND

Universal Serial BUS (USB) is an industry protocol designed to standardize the interfaces between computer devices for communication and supplying electrical power. The USB protocol has enjoyed widespread adoption in nearly every computing device, and has received tremendous support in terms of technology development with well-established intellectual property (IP) portfolios and standardized software infrastructure. USB interconnects are used in interchip communications and to connect devices through cables.

Transmission of electrical signals in a circuit board can result in signal loss. The signal loss is usually dependent on the frequency of the transmission. For example, signal loss will generally be higher at higher frequencies. The signal loss variation across the frequency range of a signal can make it more difficult for signal receivers to recover the transmitted data. Accordingly, signal equalization techniques are used to equalize the frequency dependent loss.

DESCRIPTION OF THE EMBODIMENTS

Embodiments described herein relate to techniques for training a link. Link training takes place during an initialization process that occurs when two ports are coupled together. During link training, the ports can exchange information relating to the capabilities of each port, such as speed information and power management capabilities, among others. One feature of link training is receiver equalization. In receiver equalization, each receiver in a port receives a transmitted signal pattern across a range of frequencies. The receiver then determines a series of signal gain coefficients that can be used to reduce signal strength variations across the frequency range. Frequencies that are expected to be more highly attenuated can be amplified by the transmitter prior to transmission using pre-equalization gain coefficients.

In current USB protocols, the equalization is open-loop, meaning that only the receiver equalization is adjusted. Each receiver in a port receives a pre-determined transmission pattern from its corresponding transmitter. The gain coefficients for the receiver equalization are determined based on the received signal magnitude. The gain coefficients for the transmission pattern are determined experimentally for a range of interconnect designs and pre-programmed into the port hardware. The pre-programmed transmitter gain coefficients represent transmitter coefficients that will be suitable for a broad range of interconnect designs and are not adjusted during link training.

In accordance with present techniques, the link equalization is closed-loop, meaning that equalizer coefficients for both the transmitter and the receiver can be adjusted during link training. The transmitter equalizer coefficients can be adjusted based on the actual signal quality at the receiver. In this way, better signal quality can be obtained, which can result in faster transmission speeds and longer interconnect distances. The communication protocol used during the link training process enables the transmitter and receiver to communicate reliably before the ports has been successfully trained. Examples of the present techniques may be implemented as improvements to the current USB 3.1 specification, and may be described using USB specification terminology in some instances. However, the present techniques may also be applied in relation to other communication protocols, such as the Mobile Industry Processor Interface (MIPI) D-PHY, M-PHY, and C-PHY protocols.

Figure 1:
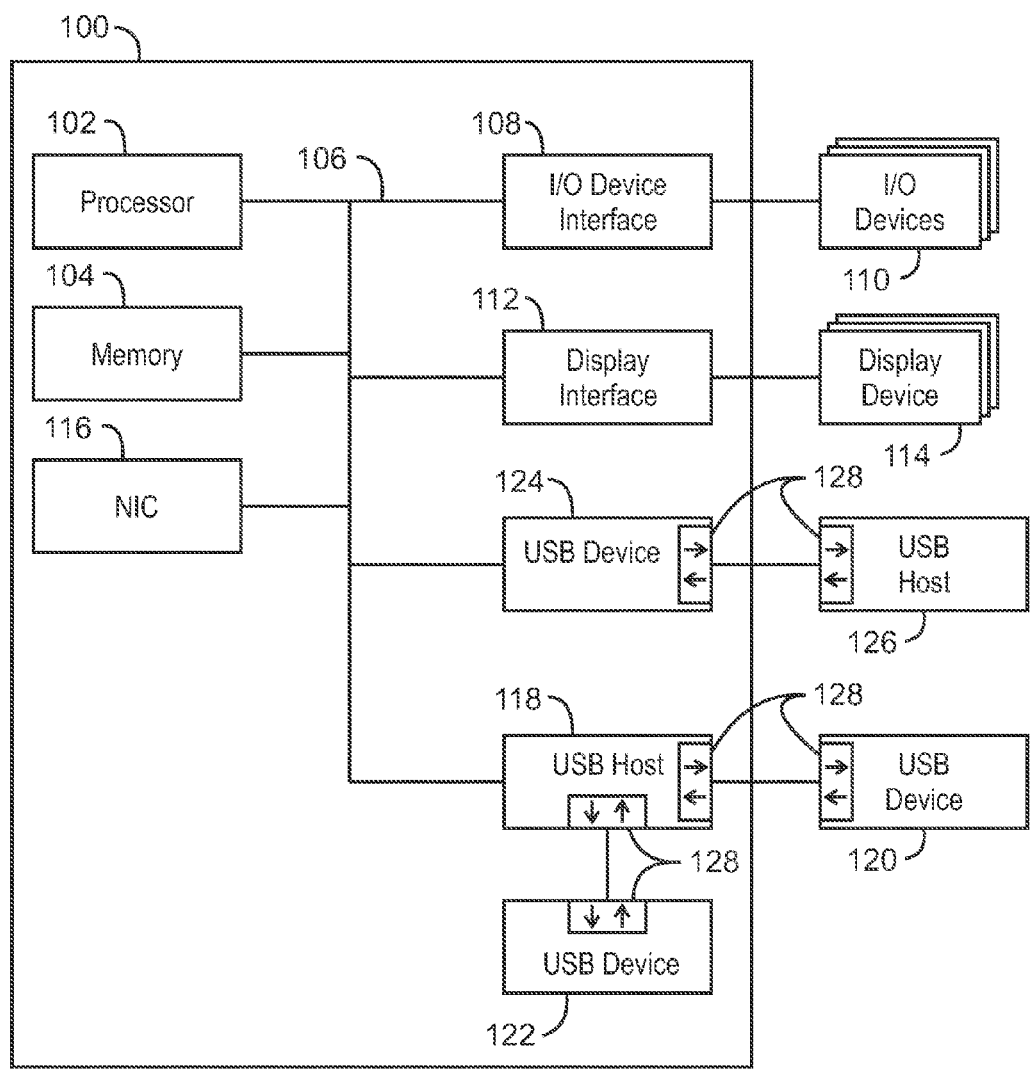
FIG. 1 is a block diagram of an example of a computing system that uses closed-loop link equalization training.

FIG. 1 is a block diagram of an example of a computing system that uses closed-loop link equalization training. The computing system 100 may be, for example, a mobile phone, laptop computer, desktop computer, or tablet computer, among others. The computing system 100 may include a processor 102 that is configured to execute stored instructions, as well as a memory device 104 that stores instructions that are executable by the processor 102. The processor 102 can be a single core processor, a multi-core processor, a computing cluster, or any number of other configurations. The memory device 104 can include random access memory (e.g., SRAM, DRAM, zero capacitor RAM, SONOS, eDRAM, EDO RAM, DDR RAM, RRAM, PRAM, etc.), read only memory (e.g., Mask ROM, PROM, EPROM, EEPROM, etc.), flash memory, or any other suitable memory systems.

The processor 102 may be connected through a system bus 106 (e.g., PCI, ISA, PCI-Express, HyperTransport®, NuBus, etc.) to an input/output (I/O) device interface 108 adapted to connect the computing system 100 to one or more I/O devices 110. The I/O devices 110 may include, for example, a graphic card, a hard disk drive, a solid state drive, a keyboard and a pointing device, wherein the pointing device may include a touchpad or a touchscreen, among others. The I/O devices 110 may be built-in components of the computing system 100, or may be devices that are externally connected to the computing system 100.

The processor 102 may also be linked through the system bus 106 to a display interface 112 adapted to connect the computing system 100 to a display device 114. The display device 114 may include a display screen that is a built-in component of the computing system 100. The display device 114 may also include a computer monitor, a television, or a projector, among others, that is externally connected to the computing system 100.

A network interface card (NIC) 116 may be adapted to connect the computing system 100 through the system bus 106 to a network (not depicted). The network (not depicted) may be a wide area network (WAN), local area network (LAN), or the Internet, among others.

The computing system 100 can include a USB host 118. The USB host 118 can be connected to the computing system 100 through the system bus 106. The USB host 118 can communicate with USB devices, including external USB devices 120 and embedded USB devices 122. As used herein, the term external USB device refers to a USB device that is coupled to the USB host 118 through a connector that enables the external USB device 120 to be physically disconnected. The term embedded USB device refers to a USB device that is connected to the same circuit board as the USB host 118 and communicates with the USB host 118 through an interchip communication link. The computing system 100 can include a USB device 124. The USB device 124 can be connected to the computing system 100 through the system bus 106. The USB device 124 can communicate with a USB host 126. The USB hosts 118 and 126 and the USB devices 120, 122, and 124 each include a USB port 128 that enables communication using the USB protocol. One or more of the USB ports 128 can be configured to use closed-loop link equalization. Furthermore, any of the USB ports 128 configured to use closed-loop link equalization can also be configured to be backward compatible with existing protocols that use open-loop link equalization, such as USB 3.0 and USB 3.1.

It is to be understood that the block diagram of FIG. 1 is not intended to indicate that the computing system 100 is to include all of the components shown in FIG. 1. Rather, the computing system 100 can include fewer or additional components not illustrated in FIG. 1 (for example, additional USB ports, additional network interfaces, etc.). Furthermore, although embodiments of the present techniques are described in relation to a USB protocol, it will be appreciated that the techniques described herein may also be used in other suitable communication protocols.

Figure 2:
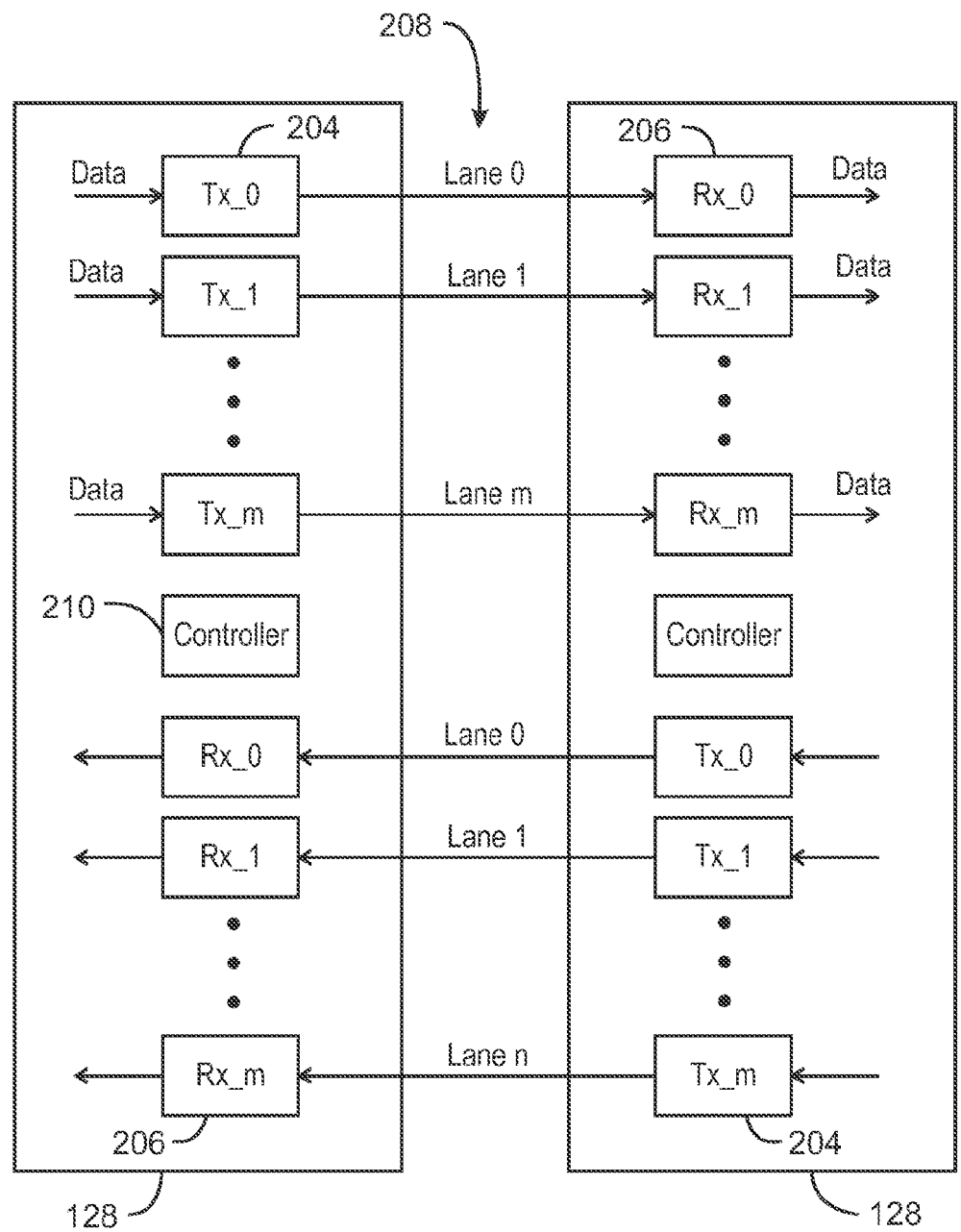
FIG. 2 is a block diagram of an example of a link between ports configured to use closed-loop link equalization training.

FIG. 2 is a block diagram of an example of a link between ports configured to use closed-loop link equalization training. The link 200 is a communication link between two ports 128, such as the ports shown in FIG. 1. In some examples, the link 200 can be a link between different computing devices. For example, with reference to FIG. 1, one of the ports 128 may be included in the computing device 100 and the other port 128 may be included in an external device 120, which may be another computing device or a peripheral device such as a printer, camera, scanner, or smart phone, among others. In some examples, the link 200 may be implemented between different components of the same device. For example, the link 200 may be used to communicate between different integrated circuit chips mounted on a same circuit board or between components of a general purpose computing device on a single motherboard.

Each port 128 can include one or more transmitters 204 and one or more receivers 206. The connection between a transmitter and its corresponding receiver is referred to herein as a lane 208. The link 200 can include any suitable number of lanes including one or more. Each port 128 also includes a controller 210 to control various aspects of the port's operation, such as host or device mode, signal equalization and link training.

Each of the transmitters 204 receives data from a sending device, encodes the data into a signal that is suitable for transmission, and transmits the signal to its corresponding receiver 206. In some examples, the encoded data is transmitted as a differential signal. The receiver 206 amplifies and decodes the received signal to regenerate the original data and sends the data to the receiving device. To correct for potential signal distortion introduced by the transmission channel, the receiver 206 can equalize the received signal by amplifying the received signal differently at different frequencies. The amplification applied across the spectrum of the received signal is characterized by an equalization function that determines the amplification that will be applied at each frequency. To further correct for potential signal distortion introduced by the transmission channel, each transmitter 204 can amplify the transmitted signal differently at different frequencies prior to transmission. The amplification applied across the spectrum of the transmitted signal is also characterized by an equalization function that determines the amplification that will be applied at each frequency. Coefficients for each of the equalization functions can be determined during a link training operation.

In some examples, the link 200 is configured for high-speed operation. For example, the link 200 may be configured to operate at frequencies above 5 Gigabits per second, such as in the USB SuperSpeed or SuperSpeedPlus protocols. During closed-loop link equalization, the transmitter and receiver can communicate as explained further below in relation to FIGS. 4 and 5. At the high frequencies at which the link 200 may be operating, communication across the link 200 may tend to be error prone prior to link equalization. To ensure reliable communication over the link 200 prior to link equalization, information and commands can be communicated between the transmitter 204 and receiver 206 during link equalization training using Low Frequency Periodic Signaling (LFPS), including a type of LFPS signaling referred to herein as LFPS-Based Pulse Width Modulation (PWM) Messaging (LBPM).

The LBPM signal is formed by alternating two signaling states, a pulsed state and an electrical idle state. The pulsed state is a state in which a low frequency periodic signal is transmitted. The electrical idle state is a state in which the link is electrically idle, and only the common mode voltage is maintained. In LBPM signaling, a single bit can be transmitted by alternating the pulsed state and the electrical idle state. The proportion of time that the pulsed state persists compared to the proportion of time that electrical idle state persists during a single period determines whether the bit is a zero or a one. For example, logic 0 may be represented within a period, T, by a pulsed state persisting for one-third of, T, followed by an electrical idle state persisting for the remaining two-thirds of the period, T. Logic 1 may be represented by a pulsed state persisting for two-thirds of the period, T, followed by an electrical idle state persisting for the remaining one-third of the period T. In some examples, the period, T, may be approximately 2.0 to 2.4 microseconds and the frequency of the LFPS signal transmitted during the pulsed state may be approximately 10 to 50 MHz. No link equalization is needed for the ports to reliably receive LBPM signals. In some examples, coded messages can be passed between ports using a string of bits generated through LBPM signaling. The coded messages generated through LBPM signaling may be referred to herein as LBPMs. The link training process is described more fully below in relation to FIGS. 4 and 5.

Figure 3:
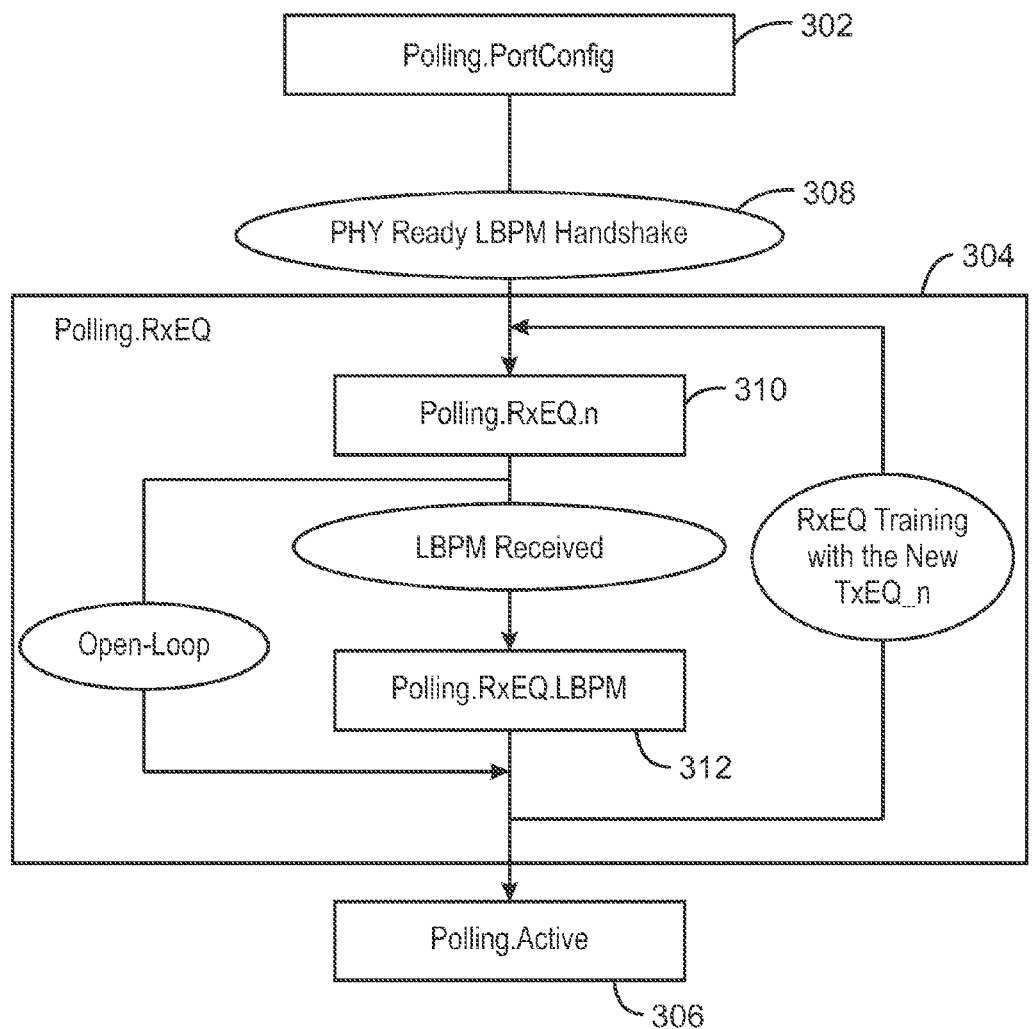
FIG. 3 is a block diagram of an example of a portion of a state machine for a port configured to use close-loop link equalization training.

FIG. 3 is a block diagram of an example of a portion of a state machine for a port configured to use close-loop link equalization training. The state machine 300 is intended to describe the present techniques in the context of the existing USB 3.1 specification. However, the techniques described herein can also be used with other communication protocols, including proprietary communication protocols. The state machine 300 is simplified for the purposes of clarity and does not show all possible states of a port or all possible state transitions between the shown states.

FIG. 3 shows three possible states of a single port, such as one of the ports 128 of FIGS. 1 and 2. The state of the second port 128 at the other end of the link is referred to as the port's link partner. The three states are referred to as Polling.PortConfig 302, Polling.RxEq 304, and Polling.Active 306. The Polling.PortConfig 302 is a state during which the port configures its PHY according to matching PHY Capabilities between the port and its link partner. For example, a port may configure its PHY for USB SuperSpeed operation or USB SuperSpeedPlus operation. The PHY capabilities may be learned in a previous state wherein the port 128 and its link partner share PHY capability information, using a PHY Capability LBPM. For example, the PHY Ready LBPM may be an 8-bit code such as the one shown in Table 1. A port exiting from Polling.PortConfig 302 and ready for PHY operation may transmit PHY Ready LBPMs, during the PHY Ready LBPM Handshake 308. The PHY Ready LBPM may be used to transmit port capabilities to its link partner, including whether the port is capable of closed-loop link equalization. For example, the PHY Ready LBPM may be an 8-bit code such as the one shown in Table 1.

TABLE 1 an Example of a PHY Capability/Ready LBPM

| Bit 0 and 1:<br>LBPM Type | Bit 2 and 3:<br>LBPM Subtype | |
|---|---|---|
| 00: PHY Capability | PHY Rate | Bits 4-7: Reserved (0) |
| | 00: 5 Gbps<br>01: 10 Gbps | |
| 01: PHY Ready | Bit 2: Training Type | |
| | 0: Closed-loop;<br>1: Open-loop<br>Bit 3: Reserved (0) | |

PHYReady LBPM is exchanged between the two ports before entry to Polling.RxEQ 304. If both ports are capable of closed-loop training, the port will enter Polling.RxEQ 304 and perform closed-loop training. Otherwise, the port will enter Polling.RxEQ 304 and performing the open-loop training.

The Polling.RxEq state 304 includes two additional substates, Polling.RxEQ.n 310 and Polling.RxEQ.LBPM 312. During Polling.RxEQ.n 310, the port transmitter transmits a data set to the receiver of the link partner, which the receiver of the link partner uses for receiver equalization. Also during Polling.RxEQ.n 310, the receiver receives a data set from the transmitter of the link partner that the receiver uses for equalization. The data set, referred to as a training sequence, TSEQ, may be repeated several times to enable each receiver to test several possible receiver equalization coefficient settings. The training sequence, TSEQ, may be transmitted using a pre-specified set of transmitter equalization coefficients, TxEQ.

After the port's transmitter has completed transmitting its training set, if both ports are not capable of closed-loop training, Polling.RxEQ.LBPM 312 is skipped and the port advances directly to Polling.Active 306. Polling.Active state 306 is a state in which additional port training processes take place. If the additional training is successful, the ports will eventually enter the normal operating state in which packets can be transmitted and received. The normal operating state may be referred to as the UO state (not shown).

If both ports are capable of closed-loop training, the port will advance from Polling.RxEQ.n 310 to Polling.RxEQ.LBPM 312 to exchange its receiver equalization training status. If the receiver's equalizer is trained, it will transmit RxReady LBPM, otherwise, it will transmit RxNotready LBPM. The port will also decode the received LBPM from its link partner, and performing the LBPM handshake in order to decide what the next step of operation should be. If both ports exchange RxReadyLBPM, both ports are trained and are ready to exit to Polling.Active 306 as a result of successful training. If at least one of the ports is not trained, in other words the LBPM handshake includes RxNotReady LBPM from at least one port, the port receiving RxNotReady LBPM will re-transmit the training sequence with new transmitter equalizer coefficients, TxEQ, and return back to Polling.RxEQ.n 310 for continued training. If the port is capable of close-loop equalizer training, the port will store n sets of transmitter equalizer coefficients, TxEQ_n, wherein n equals the number of different sets. Each time the training set is re-transmitted, it is generated with a different set of transmitter equalization coefficients. If all n sets of transmitter equalizer coefficients are tried, and there is still one port not trained, both ports will transition from Polling.RxEQ 304 to Polling.Active 306 as a result of unsuccessful training.

In some examples, the port and its link partners are configured to achieve high quality transmitter equalization and receiver equalization combination based on evaluation of several sets of transmitter equalizer coefficients. Instead of ending the link training as soon as the receiver is trained, the port requests its link partner to step through several or all of its transmitter equalizer coefficients, TxEQ_n. After each of the iterations, the receiver can evaluate the signal received from the link partner and calculate a signal quality parameter that characterizes the signal quality of the received signal. For example, the signal quality parameter may be a parameter that relates to amplitude and/or timing margins obtained from an eye diagram, such as eye height, eye width, signal to noise ratio, and jitter, among others. After the final iteration, the port can inform its link partner which set of transmitter equalizer coefficients are to be used for subsequent operation. Two examples of closed-loop link equalization training are described in more detail in relation to the process flow diagrams of FIGS. 4 and 5.

Figure 4:
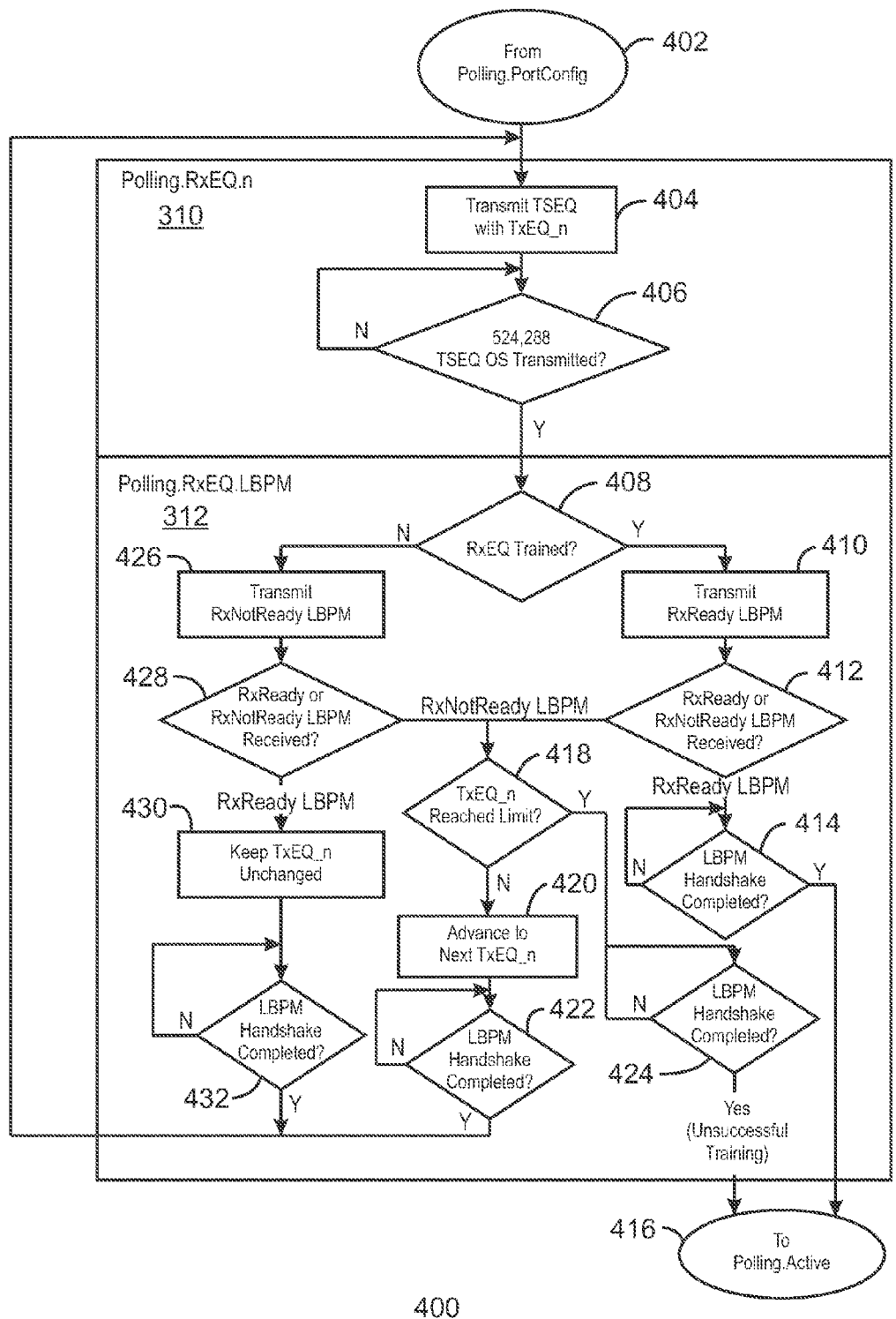
FIG. 4 is a process flow diagram of an example of close-loop link equalization training.

FIG. 4 is a process flow diagram of an example of close-loop link equalization training. The method 400 is implemented for a port that is capable of closed-loop training and also coupled to a link partner that is capable of closed-loop training. The method 400 is described in relation to a USB protocol port. However, it will be appreciated that the method 400 may be implemented in a various types of ports. Additionally, the method is described from the perspective of a single port (referred to simply as the port), which is communicating with another port (referred to as the link partner). The port and its link partner will generally follow the same method 400. The method 400 may be implemented by logic included, for example, in the controller 210 shown in FIG. 2. The logic is embodied in hardware, such as logic circuitry or one or more processors configured to execute instructions stored in a non-transitory, computer-readable medium, for example.

The method 400 may begin at block 402, wherein the port exits from the Polling.PortConfig state 302 and enters the Polling.RxEQ.n state 310 (FIG. 3). At block 404, the port's transmitter transmits the training sequence, TSEQ, with the transmitter equalization coefficients, TxEQ_n. Block 404 repeats a specified number of times to enable the link partner's receiver to enable the link partner's receiver to test several possible receiver equalization coefficient settings. In the example shown in FIG. 4, block 404 is repeated 524,288 times, as indicated at block 406. After the training sequence, TSEQ, is transmitted the specified number of times, the process flow advances from block 406 to block 408 of the Polling.RxEQ.LBPM state 312.

At block 408, the port has received a training sequence, TSEQ, from its link partner and determines whether its own receiver is trained. If the receiver is successfully trained, the process flow advances to block 410 and the port transmits RxReady LBPM to its link partner and waits for an RxReady or RxNotReady LBPM from its link partner.

At block 412, the port determines what type of LBPM the port received from its link partner. If the port receives an RxReady LBPM, the process flow advances to block 414.

At block 414, the port determines whether the LBPM handshake with the link partner has been completed. If the LBPM handshake has been completed, the process flow advances to block 416, wherein the port exits to the Polling.Active state 306 (FIG. 3) as a result of successful link training.

Returning to block 412, if the port receives an RxNotReady LBPM, (the port's own receiver is trained, but the port's link partner is not), the process flow advances to block 418.

At block 418, the port determines whether it has reached the limit on the set of n transmitter equalization coefficients, TxEQ, in other words, the nth set has already been sent in a previous iteration. If there are remaining transmitter equalization coefficient sets to be tried, the process flow advances to block 420 and the port advances to the next set of transmitter equalization coefficients. The process flow then advances to block 422.

At block 422, the port determines whether the LBPM handshake with the link partner has been completed. If the LBPM handshake has been completed, the process flow advances to block 404.

At block 404, the port's transmitter transmits the training sequence, TSEQ, using the new set of transmitter equalization coefficients, TxEQ, and a new iteration of the process begins.

Returning to block 418, if the port determines that there are no remaining transmitter equalization coefficient sets to be tried, the process flow advances to block 424.

At block 424, the port determines whether the LBPM handshake with the link partner has been completed. If the LBPM handshake has been completed, the process flow advances to block 416, wherein the port exits to the Polling.Active state 306 (FIG. 3) as a result of unsuccessful link training.

Returning to block 408, if the receiver is not successfully trained, the process flow advances to block 426. At block 426, the port transmits RxNotReady LBPM to its link partner and waits for an RxReady or RxNotReady LBPM from its link partner. At block 428, the port determines what type of LBPM the port received from its link partner. If the port receives an RxNotReady LBPM (neither port was successfully trained), the process flow advances to block 418, in which case the port will advance to the next set of transmitter equalization coefficients, as explained above. If the port receives an RxReady LBPM (The port is not successfully trained, but the port's link partner is), the process flow advances to block 430, and the set of transmitter equalization coefficients remains unchanged.

At block 432, the port determines whether the LBPM handshake with the link partner has been completed. If the LBPM handshake has been completed, the process flow advances to block 404.

At block 404, the port's transmitter transmits the training sequence, TSEQ, using the previous set of transmitter equalization coefficients, TxEQ, and awaits for the new training set, TSEQ, with the new set of transmitter equalization coefficients, TxEQ, to be received from the link partner, after which a new iteration of the process begins.

The process flow continues until both the port and its link partner are successfully trained or until one of the ports remains untrained and the limit has been reached on the number of set of transmitter equalization coefficients, TxEQ_n, has been reached. If both ports have been successfully trained, the last set of transmitter equalization coefficients used by the port will be the set used for all future communications unless link training is repeated.

Figure 5:
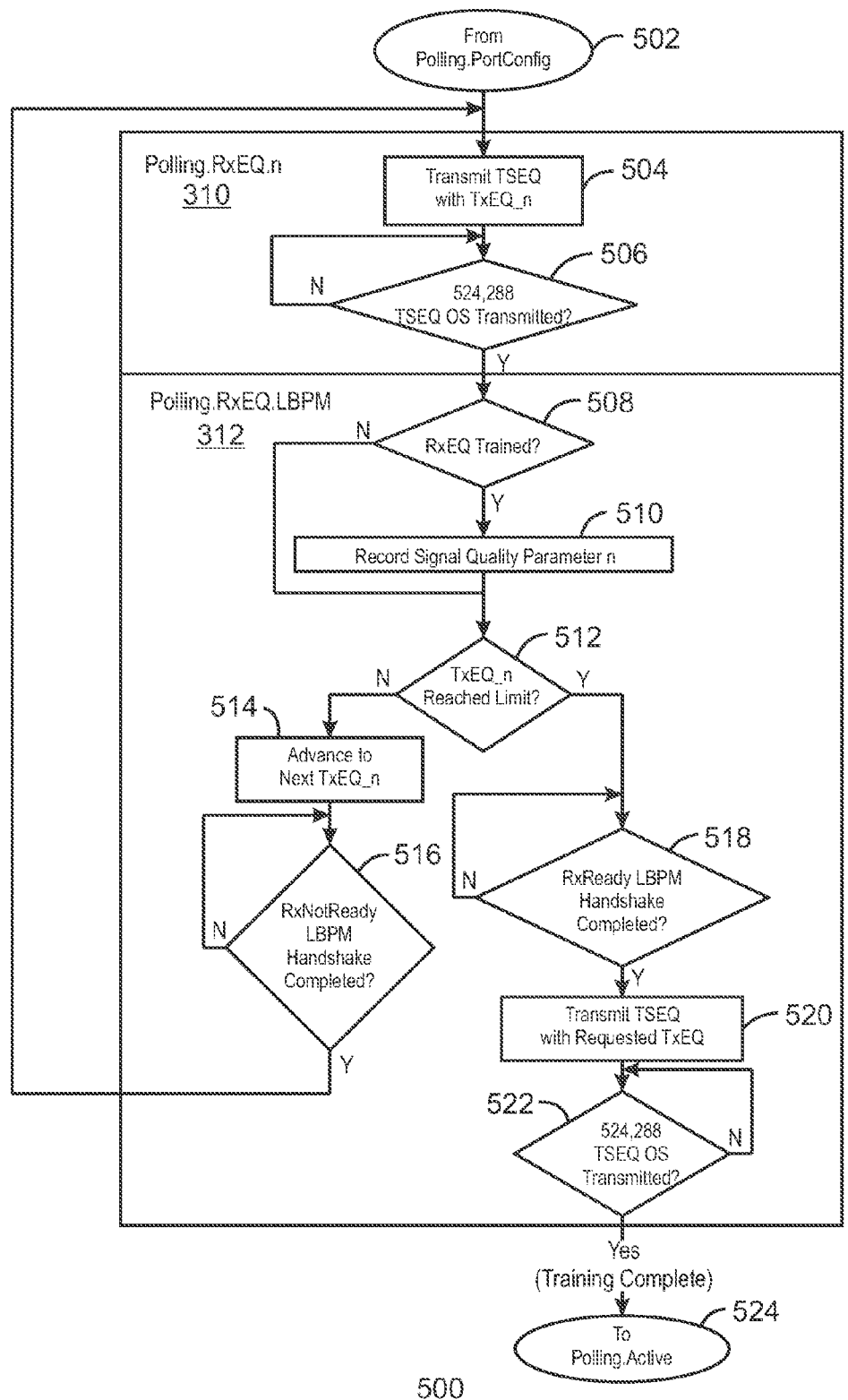
FIG. 5 is a process flow diagram of another example of close-loop link equalization training.

FIG. 5 is a process flow diagram another example of close-loop link equalization training. The method 500 is implemented for a port that is capable of closed-loop training and also coupled to a link partner that is capable of closed-loop training. The method 500 is described in relation to a USB protocol port. However, it will be appreciated that the method 500 may be implemented in a various types of ports. Additionally, the method is described from the perspective of a single port (referred to simply as the port), which is communicating with another port (referred to as the link partner). The port and its link partner will generally follow the same method 500. The method 500 may be implemented by logic included, for example, in the controller 210 shown in FIG. 2. The logic is embodied in hardware, such as logic circuitry or one or more processors configured to execute instructions stored in a non-transitory, computer-readable medium, for example. For the following method, the RxNotReady LBPM indicates that training with the current transmitter equalizer setting is completed, and RxReadyLBPM indicates the completion of the exhaustive training such that all of the transmitter equalizer settings have been tried.

The method 500 may begin at block 502, wherein the port exits from the Polling.PortConfig state 302 (FIG. 3) and enters the Polling.RxEQ.n state 310. At block 504, the port's transmitter transmits the training sequence, TSEQ, with the transmitter equalization coefficients, TxEQ_n. Block 504 repeats a specified number of times to enable the link partner's receiver to enable the link partner's receiver to test several possible receiver equalization coefficient settings. In the example shown in FIG. 5, block 504 is repeated 524,288 times, as indicated at block 506. After the training sequence, TSEQ, is transmitted the specified number of times, the process flow advances from block 506 to block 508 of the Polling.RxEQ.LBPM state 312.

At block 508, the port has received a training sequence, TSEQ, from its link partner and determines whether its own receiver is trained. If the receiver is successfully trained, the process flow advances to block 510. At block 510, the receiver can calculate and store a signal quality parameter that characterizes the signal quality of the equalized signal. For example, the signal quality parameter may be a parameter that relates to amplitude and/or timing margins obtained from an eye diagram, such as eye height, eye width, signal to noise ratio, and jitter, among others. The stored signal quality parameter is associated with the corresponding transmitter equalizer coefficients for that transmission.

At block 512, the port determines whether it has reached the limit on the set of n transmitter equalization coefficients, TxEQ, in other words, whether the nth set has already been sent in a previous iteration. If there are remaining TxEq sets to be tried, the process flow advances to block 514 and the port advances to the next set of transmitter equalization coefficients. The process flow then advances to block 516.

At block 516, the port determines whether the RxNotReady LBPM handshake with the link partner has been completed. If the RxNotReady LBPM handshake has been completed, the process flow returns back to block 504. At block 504, the port's transmitter transmits the training sequence, TSEQ, with the new set of transmitter equalization coefficients, TxEQ, and a new iteration of the process begins. Returning to block 512, if the port determines that there are no remaining transmitter equalization coefficient sets to be tried, the process flow advances to block 518.

At block 518, the port determines whether the RxReady LBPM handshake with the link partner has been completed. The RxReadyLBPM sent by the port contains an indicator that identifies the set of transmitter equalizer coefficients the transmitter of the link partner should use for subsequent transmissions. The port will choose the transmitter equalizer coefficients that resulted in better signal quality as measured by the signal quality parameter. If the RxReady LBPM handshake has been completed, the process flow advances to block 522.

At block 522, the port transmits the training sequence, TSEQ, with the transmitter equalization coefficients requested by the link partner. The process flow then advances to block 524, wherein the port exits to the Polling.Active state 306 (FIG. 3).

EXAMPLES

Examples may include subject matter such as a method, means for performing acts of the method, at least one machine-readable medium including instructions that, when performed by a machine cause the machine to performs acts of the method, or of an apparatus or system for training a link according to embodiments and examples described herein.

Example 1 is an electronic device configured to perform closed-loop equalizer training. The electronic device includes a port coupled to a link partner. The port and the link partner are configured to use closed-loop equalizer training to obtain receiver equalization coefficients for the receiver of the port and obtain transmitter equalization coefficients for the transmitter of the link partner. Optionally, during the closed-loop equalizer training, the port is to exchange training messages with the link partner using Low Frequency Periodic Signaling (LFPS) with a frequency of less than 50 MHz, and after closed-loop equalizer training, the port is to exchange packet data at a data rate equal or greater than 5 Gigabits per second (Gbps). The port may optionally exchange training messages with the link partner using LFPS-based Pulse Width Modulated Messaging (LBPM).

Example 2 is an electronic device that includes the subject matter of example 1, either including or omitting optional features, wherein during the closed-loop equalizer training, the link partner sends a plurality of transmissions of a training set to the port. Each of the plurality of transmissions of the training set can use a different set of transmitter equalizer coefficients. The training set is used by the port to generate a set of receiver equalizer coefficients. The plurality of transmissions of the training set can include a first transmission and a second transmission. The second transmission can sent to the port in response to an inability of the port to successfully train its receiver using the first transmission. In some implementations, the port determines which of the plurality of transmissions of the training set resulted in better signal quality, and the port informs the link partner to use the corresponding set of transmitter equalizer coefficients for transmitting packet data.

In examples 1 and 2, the port can be a USB port, such as a USB SuperSpeed or USB SuperSpeedPlus port. In examples 1 and 2, the port and the link partner can optionally exchange port capability information that indicates whether each port is able to perform closed-loop equalizer training. The port capability information can optionally be included in a PHY Ready LBPM. In examples 1 and 2, the port can perform open-loop equalizer training if the link partner does not identify itself as being able to perform closed-loop training.

Example 3 is a port configured to perform closed-loop equalizer training. The port can include a receiver, the receiver being configured to receive a first transmission of a training set from a link partner and use the first transmission of the training set to generate a first set of receiver equalizer coefficients, wherein the first transmission of the training set is transmitted by the link partner using a first set of transmitter equalizer coefficients. The receiver is also configured to receive a second transmission of the training set from the link partner and use the second transmission of the training set to generate a second set of receiver equalizer coefficients, wherein the second transmission of the training set is transmitted by the link partner using a second set of transmitter equalizer coefficients. The receiver is also configured to equalize signals received from the link partner using the first set of receiver equalizer coefficients or the second set of receiver equalizer coefficients. Optionally, the port can exchange equalizer training messages with the link partner using Low Frequency Periodic Signaling (LFPS) with a frequency of less than 100 MHz, and the signals are received from the link partner at a data rate equal or greater than 5 Gigabits per second (Gbps). The port can exchange equalizer training messages with the link partner using LFPS-based Pulse Width Modulated Messaging (LBPM).

Example 4 is port that includes the subject matter of example 3, either including or omitting optional features, wherein the second transmission of the training set is transmitted by the link partner in response to an inability of the receiver to successfully train using the first transmission. The inability of the receiver to successfully train can optionally be determined based a measurement of the signal quality received by the receiver after applying the first set of receiver equalizer coefficients.

Example 5 is port that includes the subject matter of example 3, either including or omitting optional features, wherein the port determines whether the first or second transmission of the training set resulted in better signal quality, and the port informs the link partner to use the corresponding set of transmitter equalizer coefficients for transmitting the signal.

In examples 3 to 5, the port can be a USB port, such as a USB SuperSpeed or USB SuperSpeedPlus port. In examples 3 to 5, the port and the link partner exchange port capability information that indicates whether each port is able to perform closed-loop equalizer training. The port capability information can be included in a PHY Ready LBPM. In examples 3 to 5, the port can optionally perform open-loop equalizer training if the link partner does not identify itself as being able to perform closed-loop training.

Example 6 is a computing device comprising logic to perform closed-loop equalizer training. The logic is to receive, at a port, a first transmission of a training set from a link partner and use the first transmission of the training set to generate a first set of receiver equalizer coefficients, wherein the first transmission of the training set is transmitted by the link partner using a first set of transmitter equalizer coefficients. The logic is also to receive, at the port, a second transmission of the training set from the link partner and use the second transmission of the training set to generate a second set of receiver equalizer coefficients, wherein the second transmission of the training set is transmitted by the link partner using a second set of transmitter equalizer coefficients. The logic is also to process packet data received from the link partner using the first set of receiver equalizer coefficients or the second set of receiver equalizer coefficients. Optionally, the port can exchange equalizer training messages with the link partner using LFPS-based Pulse Width Modulated Messaging (LBPM).

Example 7 is a computing device that includes the subject matter of example 6, either including or omitting optional features, wherein the second transmission of the training set is transmitted by the link partner in response to an inability of the receiver to successfully train using the first transmission.

The inability of the receiver to successfully train can be determined based a measurement of the signal quality received by the receiver after applying the first set of receiver equalizer coefficients.

Example 8 is a computing device that includes the subject matter of example 6, either including or omitting optional features, wherein the port determines whether the first or second transmission of the training set resulted in better signal quality, and the port informs the link partner to use the corresponding set of transmitter equalizer coefficients for transmitting the signal.

In examples 6 to 8, the computing device can be a laptop computer and the port can be a USB port, such as a USB SuperSpeed or USB SuperSpeedPlus port. The port and the link partner exchange port capability information that indicates whether each port is able to perform closed-loop equalizer training. In examples 6 to 8, the port capability information can optionally be included in a PHY Ready LBPM. In examples 6 to 8, the port can optionally perform open-loop equalizer training if the link partner does not identify itself as being able to perform closed-loop training.

Example 9 is a method of operating a port that is capable of closed-loop equalizer training. The method includes receiving, at a port, a first transmission of a training set from a link partner, wherein the first transmission of the training set is transmitted by the link partner using a first set of transmitter equalizer coefficients. The method also includes generating a first set of receiver equalizer coefficients based on the first transmission of the training set. The method also includes receiving a second transmission of the training set from the link partner wherein the second transmission of the training set is transmitted by the link partner using a second set of transmitter equalizer coefficients. The method also includes generating a second set of receiver equalizer coefficients based on the second transmission of the training set. The method also includes equalizing signals received from the link partner using the first set of receiver equalizer coefficients or the second set of receiver equalizer coefficients. The method optionally includes exchanging equalizer training messages with the link partner using Low Frequency Periodic Signaling (LFPS) with a frequency of less than 100 MHz, wherein the signals are received from the link partner at a data rate equal or greater than 5 Gigabits per second (Gbps). Exchanging equalizer training messages with the link partner can optionally include encoding the equalizer training messages using LFPS-based Pulse Width Modulated Messaging (LBPM).

Example 10 is a method that includes the subject matter of example 9, either including or omitting optional features, and further including requesting the second transmission of the training set in response to an inability of the receiver to successfully train using the first transmission. The method of example 10 can also include measuring the signal quality received by the receiver after applying the first set of receiver equalizer coefficients and determining the inability of the receiver to successfully train based the signal quality.

Example 11 is a method that includes the subject matter of example 9, either including or omitting optional features, and further including determining whether the first or second transmission of the training set resulted in better signal quality, and informing the link partner to use the corresponding set of transmitter equalizer coefficients for transmitting the signals.

In any of examples 9 to 11, the port can be a USB port, such as a USB SuperSpeed or USB SuperSpeedPlus port. In any of examples 9 to 11, the method can include receiving port capability information from the link partner that indicates whether the link partner is able to perform closed-loop equalizer training. The port capability information can optionally be included in a PHY Ready LBPM. In any of examples 9 to 11, the method can include performing open-loop equalizer training if the link partner does not identify itself as being able to perform closed-loop training.

Example 12 is a machine-readable medium comprising code that, when executed, causes an electronic device to perform the method of any of examples 9 to 11. Example 13 is an apparatus that includes means to perform the method of any of examples 9 to 11.

Example 14 is an apparatus that is capable of closed-loop equalizer training. The apparatus includes means to receive a first transmission of a training set from a link partner, wherein the first transmission of the training set is transmitted by the link partner using a first set of transmitter equalizer coefficients. The apparatus also includes means to generate a first set of receiver equalizer coefficients based on the first transmission of the training set. The apparatus also includes means to receive a second transmission of the training set from the link partner wherein the second transmission of the training set is transmitted by the link partner using a second set of transmitter equalizer coefficients. The apparatus also includes means to generate a second set of receiver equalizer coefficients based on the second transmission of the training set. The apparatus also includes means to equalize signals received from the link partner using the first set of receiver equalizer coefficients or the second set of receiver equalizer coefficients. The apparatus can optionally include means to exchange equalizer training messages with the link partner using Low Frequency Periodic Signaling (LFPS) with a frequency of less than 100 MHz, wherein the signals are received from the link partner at a data rate equal or greater than 5 Gigabits per second (Gbps). The means to exchange equalizer training messages with the link partner can optionally encode the equalizer training messages using LFPS-based Pulse Width Modulated Messaging (LBPM).

Example 15 is an apparatus that includes the subject matter of example 14, either including or omitting optional features, and further including means to request the second transmission of the training set in response to an inability of the receiver to successfully train using the first transmission. Example 15 can also include means to measure the signal quality received by the receiver after applying the first set of receiver equalizer coefficients and determine the inability of the receiver to successfully train based the signal quality.

Example 16 is an apparatus that includes the subject matter of example 14, either including or omitting optional features, and further including means to determine whether the first or second transmission of the training set resulted in better signal quality and inform the link partner to use the corresponding set of transmitter equalizer coefficients for transmitting the signals.

Examples 14 to 16 can optionally include means to generate a PHY Ready LBPM that includes port capability information that indicates an ability to perform closed-loop equalizer training.

Although some embodiments have been described in reference to particular implementations, other implementations are possible according to some embodiments. Additionally, the arrangement and order of circuit elements or other features illustrated in the drawings or described herein need not be arranged in the particular way illustrated and described. Many other arrangements are possible according to some embodiments.

In each system shown in a figure, the elements in some cases may each have a same reference number or a different reference number to suggest that the elements represented could be different or similar. However, an element may be flexible enough to have different implementations and work with some or all of the systems shown or described herein. The various elements shown in the figures may be the same or different. Which one is referred to as a first element and which is called a second element is arbitrary.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Although flow diagrams or state diagrams may have been used herein to describe embodiments, the inventions are not limited to those diagrams or to corresponding descriptions herein. For example, flow need not move through each illustrated box or state or in exactly the same order as illustrated and described herein.

The inventions are not restricted to the particular details listed herein. Indeed, those skilled in the art having the benefit of this disclosure will appreciate that many other variations from the foregoing description and drawings may be made within the scope of the present inventions. Accordingly, it is the following claims including any amendments thereto that define the scope of the inventions.

What is claimed is:

1. An electronic device comprising:
a port coupled to a link partner, the port and the link partner to use closed-loop equalizer training to obtain receiver equalization coefficients for the receiver of the port and obtain transmitter equalization coefficients for the transmitter of the link partner;
wherein during the closed-loop equalizer training, the link partner is to send a plurality of transmissions of a training set to the port, wherein each of the plurality of transmissions of the training set uses a different set of transmitter equalizer coefficients, and wherein the training set is used by the port to generate a set of receiver equalizer coefficients; and
wherein the port determines which of the plurality of transmissions of the training set resulted in better signal quality, and the port informs the link partner to use the corresponding set of transmitter equalizer coefficients for transmitting packet data.

2. The electronic device of claim 1, wherein:
during the closed-loop equalizer training, the port is to exchange training messages with the link partner using Low Frequency Periodic Signaling (LFPS) with a frequency of less than 50 MHz; and
after closed-loop equalizer training, the port is to exchange packet data at a data rate equal or greater than 5 Gigabits per second (Gbps).

3. The electronic device of claim 2, wherein during the closed-loop equalizer training, the port is to exchange training messages with the link partner using LFPS-based Pulse Width Modulated Messaging (LBPM).

4. The electronic device of claim 1, wherein the plurality of transmissions of the training set comprises a first transmission and a second transmission, wherein the second transmission is sent to the port in response to an inability of the port to successfully train its receiver using the first transmission.

5. The electronic device of claim 1, wherein the port is a USB SuperSpeed or USB SuperSpeedPlus port.

6. A port, comprising:
a receiver to:
receive a first transmission of a training set from a link partner and use the first transmission of the training set to generate a first set of receiver equalizer coefficients, wherein the first transmission of the training set is transmitted by the link partner using a first set of transmitter equalizer coefficients;
receive a second transmission of the training set from the link partner and use the second transmission of the training set to generate a second set of receiver equalizer coefficients, wherein the second transmission of the training set is transmitted by the link partner using a second set of transmitter equalizer coefficients; and
equalize signals received from the link partner using the first set of receiver equalizer coefficients or the second set of receiver equalizer coefficients;
wherein the port determines whether the first or second transmission of the training set resulted in better signal quality, and the port informs the link partner to use the corresponding set of transmitter equalizer coefficients for transmitting the signal.

7. The port of claim 6, wherein the port is to exchange equalizer training messages with the link partner using Low Frequency Periodic Signaling (LFPS) with a frequency of less than 100 MHz, and wherein the signal is received from the link partner at a data rate equal or greater than 5 Gigabits per second (Gbps).

8. The port of claim 6, wherein the port is to exchange equalizer training messages with the link partner using LFPS-based Pulse Width Modulated Messaging (LBPM).

9. The port of claim 6, wherein the second transmission of the training set is transmitted by the link partner in response to an inability of the receiver to successfully train using the first transmission.

10. The port of claim 9, wherein the inability of the receiver to successfully train is determined based on a measurement of the signal quality received by the receiver after applying the first set of receiver equalizer coefficients.

11. The port of claim 6, wherein the port is a USB SuperSpeed or USB SuperSpeedPlus port.

12. A computing device, comprising logic to:
receive, at a port, a first transmission of a training set from a link partner and use the first transmission of the training set to generate a first set of receiver equalizer coefficients, wherein the first transmission of the training set is transmitted by the link partner using a first set of transmitter equalizer coefficients;
receive, at the port, a second transmission of the training set from the link partner and use the second transmission of the training set to generate a second set of receiver equalizer coefficients, wherein the second transmission of the training set is transmitted by the link partner using a second set of transmitter equalizer coefficients; and process packet data received from the link partner using the first set of receiver equalizer coefficients or the second set of receiver equalizer coefficients;

wherein the port determines whether the first or second transmission of the training set resulted in better signal quality, and the port informs the link partner to use the corresponding set of transmitter equalizer coefficients for transmitting the signal.

13. The computing device of claim 12, wherein the port is to exchange equalizer training messages with the link partner using LFPS-based Pulse Width Modulated Messaging (LBPM).

14. The computing device of claim 12, wherein the second transmission of the training set is transmitted by the link partner in response to an inability of the receiver to successfully train using the first transmission.

15. The computing device claim 14, wherein the inability of the receiver to successfully train is determined based on a measurement of the signal quality received by the receiver after applying the first set of receiver equalizer coefficients.

16. The computing device of claim 12, wherein the computing device is a laptop computer.

* * * * *